US008762154B1

(12) United States Patent
Witt-ehsani

(10) Patent No.: US 8,762,154 B1
(45) Date of Patent: Jun. 24, 2014

(54) METHOD AND APPARATUS OF ESTIMATING OPTIMUM DIALOG STATE TIMEOUT SETTINGS IN A SPOKEN DIALOG SYSTEM

(75) Inventor: Silke Witt-ehsani, Sunnyvale, CA (US)

(73) Assignee: West Corporation, Omaha, NE (US)

( * ) Notice: Subject to any disclaimer, the term of this patent is extended or adjusted under 35 U.S.C. 154(b) by 95 days.

(21) Appl. No.: 13/210,029

(22) Filed: Aug. 15, 2011

(51) Int. Cl.
*G10L 21/00* (2013.01)
*G10L 25/00* (2013.01)

(52) U.S. Cl.
USPC ............. 704/270.1; 704/240; 379/88.01

(58) Field of Classification Search
CPC ........... H04M 3/493; H04M 2201/40; H04M 3/4938; H04M 3/4936; G10L 15/22
USPC .............. 704/210, 233, 240; 379/88.01
See application file for complete search history.

(56) References Cited

U.S. PATENT DOCUMENTS

| | | | |
|---|---|---|---|
| 5,493,608 A * | 2/1996 | O'Sullivan .............. 379/88.04 |
| 6,009,210 A * | 12/1999 | Kang ...................... 382/276 |
| 6,173,266 B1 * | 1/2001 | Marx et al. .............. 704/270 |
| 6,606,598 B1 * | 8/2003 | Holthouse et al. ....... 704/275 |
| 6,766,319 B1 * | 7/2004 | Might ...................... 1/1 |
| 7,684,990 B2 * | 3/2010 | Caskey et al. .......... 704/270.1 |
| 7,747,792 B2 * | 6/2010 | Chi et al. ................ 710/18 |
| 2005/0071172 A1 * | 3/2005 | James .................... 704/275 |
| 2006/0206329 A1 * | 9/2006 | Attwater et al. ......... 704/252 |
| 2012/0271634 A1 * | 10/2012 | Lenke .................... 704/251 |
| 2013/0070910 A1 * | 3/2013 | O'Sullivan .............. 379/88.01 |

OTHER PUBLICATIONS

Witt, S. M., Rolandi, W., Zuber, E., Brooks, T., Master, A., & Loose, R. (Dec. 2010). A study of caller response intervals in spoken dialog systems. In Spoken Language Technology Workshop (SLT), 2010 IEEE (pp. 301-305). IEEE.*
Commarford, P. M., & Lewis, J. R. (2005). Optimizing the Pause Length before Presentation of Global Navigation Commands. In Proceedings of HCI (vol. 2, pp. 1-7).*
Papoulis, A., & Pillai, S. U. (2002). Probability, random variables, and stochastic processes. Tata McGraw-Hill Education. p. 84.*
Witt, S. M. (Sep. 2012). Caller Response Timing Patterns in Spoken Dialog Systems. In InterSpeech.*

* cited by examiner

*Primary Examiner* — Douglas Godbold
*Assistant Examiner* — Ernest Estes

(57) ABSTRACT

Example embodiments of the present invention may include a method that includes collecting caller response timings to each of a plurality of dialog states conducted during a call, and estimating a plurality of parameters based on the caller response timings. The method may also include selecting a response completeness value responsive to the estimated plurality of parameters, the response completeness value is used to calculate at least one optimal timeout value. The method may also include selecting the at least one optimal timeout value, and setting the at least one optimal timeout value for each of the corresponding dialog states. The timeout value(s) may be used for subsequent calls to provide optimal user satisfaction and call success rates.

17 Claims, 6 Drawing Sheets

| Dialog State | Type | $\mu_{D_i}$ | $\sigma_{D_i}$ | $X^2$ | $F(x)=0.95$ | $F(x)=0.98$ |
|---|---|---|---|---|---|---|
| OpenEnded | Open Ended | 3.6s | 1.15s | 0.002 | 6s | 7s |
| GuideMe | Menu | 4.2s | 0.5s | 0.015 | 5s | 5.5s |
| AgentSomethingElse | Menu | 1.26s | 0.71s | 0.014 | 2.5s | 3s |
| videoGeneralDisambig | Menu | | | | | |
| billingGeneralDisambig | Menu | | | | | |
| disconnectDisambig | Menu | | | | | |
| downgradeDisambig | Menu | | | | | |
| addABoxExplicit | Confirmation | | | | | |
| AppointmentsExplicit | Confirmation | | | | | |
| billingGeneralExplicit | Confirmation | | | | | |
| billingOtherExplicit | Confirmation | | | | | |
| findPaymentCenterExplicit | Confirmation | | | | | |
| addABoxExplicit | Confirmation | | | | | |
| appointmentsExplicit | Confirmation | | | | | |
| billingGeneralExplicit | Confirmation | | | | | |
| billingOtherExplicit | Confirmation | | | | | |

METHOD AND APPARATUS OF ESTIMATING OPTIMUM DIALOG STATE TIMEOUT SETTINGS IN A SPOKEN DIALOG SYSTEM

CROSS REFERENCE TO RELATED APPLICATIONS

None.

TECHNICAL FIELD OF THE INVENTION

This invention relates to a method and apparatus of estimating individual timeout settings for each dialog state in a spoken dialog call processing application, and more particularly, to estimating timeout settings in order to minimize turn-taking issues and to optimize a total call duration.

BACKGROUND OF THE INVENTION

One of the biggest challenges in commercial spoken dialog applications and related call processing systems is estimating an appropriate turn-taking behavior by the system. In order to establish successful rules and algorithms to calculate when the system should allow a user to take a turn or vice versa, various human response timing patterns may be examined.

Sometimes it is the minor details that determine whether a spoken dialog system is successful or not according to users' satisfaction and response feedback. For example, while limited amounts of data are available for the turn-taking behavior between humans and spoken dialog call processing systems, the pause duration between questions and responses may be important in addition to other time durations measured and applied to call dialog systems. User satisfaction is important since the number of users who refuse to communicate with such a system will increase if the various dialog parameters are not properly configured.

SUMMARY OF THE INVENTION

An example embodiment may provide a method that includes collecting caller response timings to each of a plurality of dialog states conducted during a call, estimating a plurality of parameters based on the caller response timings, selecting a response completeness value responsive to the estimated plurality of parameters, the response completeness value or confidence value being used to calculate at least one optimal timeout value, selecting the at least one optimal timeout value, and setting the at least one optimal timeout value for each of the corresponding dialog states.

Another example embodiment may include an apparatus that includes a receiver configured to receive caller response timings to each of a plurality of dialog states conducted during a call. The apparatus may also include a processor configured to estimate a plurality of parameters based on the caller response timings, select a response completeness value responsive to the estimated plurality of parameters, the response completeness value being a success rate used to calculate at least one optimal timeout value, select the at least one optimal timeout value, and set the at least one optimal timeout value for each of the corresponding dialog states.

BRIEF DESCRIPTION OF THE DRAWINGS

FIG. 2B illustrates a table modeling dialog states and corresponding data calculations based on user responses according to example embodiments of the present invention.

DETAILED DESCRIPTION OF THE INVENTION

It will be readily understood that the components of the present invention, as generally described and illustrated in the figures herein, may be arranged and designed in a wide variety of different configurations. Thus, the following detailed description of the embodiments of a method, apparatus, and system, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment of the present invention. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

Figure 1:
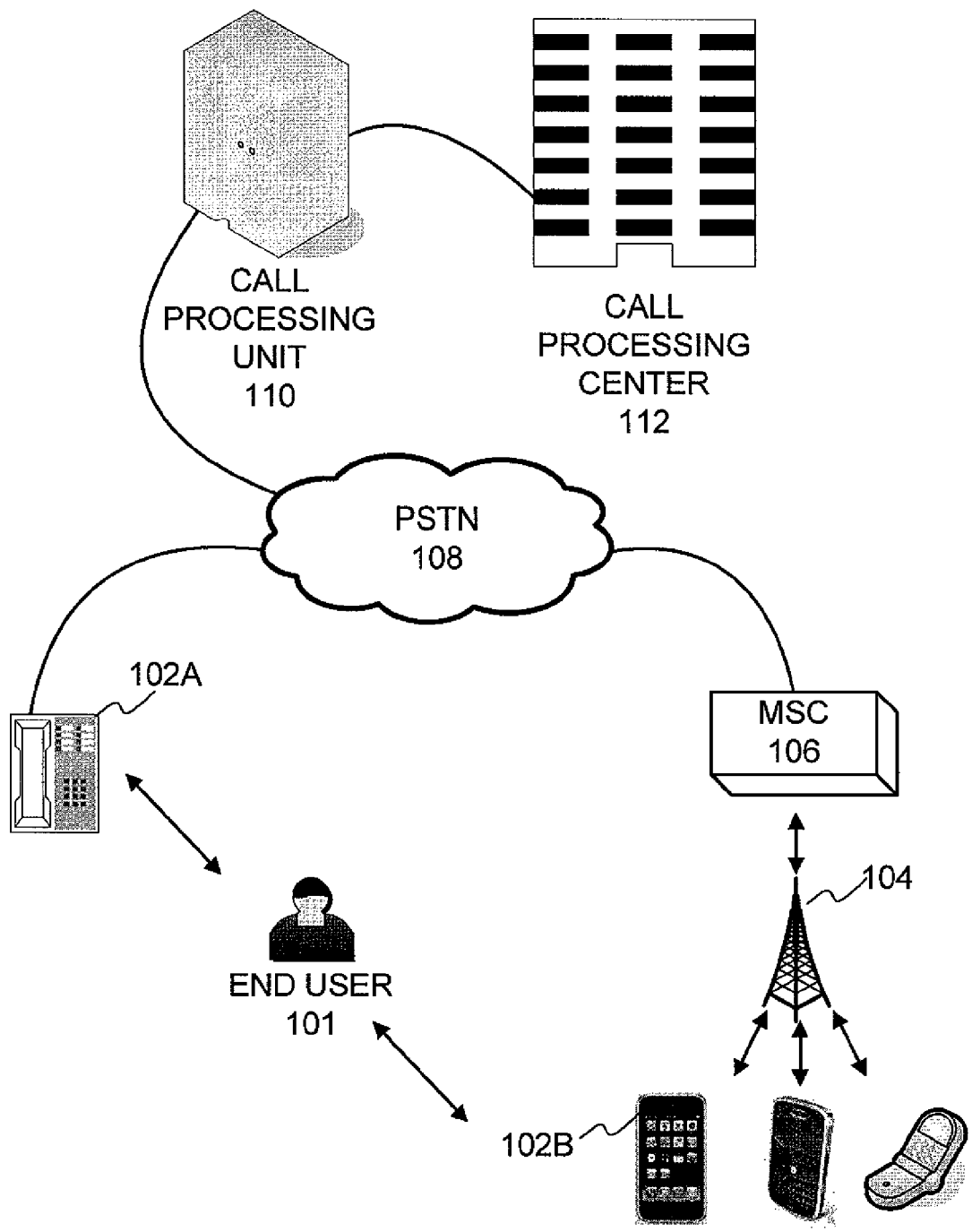
FIG. 1 illustrates an example network configuration according to example embodiments of the present invention.

FIG. 1 illustrates an example communication network according to example embodiments. Referring to FIG. 1, a communication network 100 includes an end user 101 accessing a call processing center 112 via a landline telephone 102A or a mobile station 102B. The landline telephone 102A may communicate over the public switched telephone network (PSTN) 108 to communicate with a call processing unit 110 configured to process a call for a larger call processing center 112. Alternatively, an end user 101 may conduct a call via a mobile station (e.g., cell phone, smartphone, web-enabled phone, etc.) 102B to a base station 102 and mobile switching center 106, which connects the call to the call processing unit 110 via the PSTN 108. The call processing unit 108 may represent a server(s) that is configured to enable the automated dialog call processing system for a particular call processing center 112.

According to example embodiments of the present invention, a pause duration or no-response timeout setting used during the course of a spoken dialog call may impact the overall performance of a related call application. Determining a pause duration and timeout value that are optimal for a particular dialog state may enable faster end users to quickly navigate through an automated speech dialog call processing system menu, while still providing enough instructions and details for slower novice users.

Optimizing the timeout settings for a given dialog state may minimize the number of turn-taking errors and the duration of silence for those callers who decide not to respond but to rather wait for additional instructions. Certain commercial spoken dialog systems may use a global timeout setting for all dialog states used by the system. However, it has been demonstrated that the response patterns for different dialog states vary greatly and thus it is appropriate to have a dialog state specific timeout setting that is tailored to the dynamic nature of a spoken dialog system. A dialog state may be any call related question or prompt and corresponding response. A dialog state may represent a spoken question and answer or a DTMF menu-based question or survey. In most instances, a dialog state will involve at least some form of user feedback whether it be a voice response, DTMF response or a silent response.

One example of optimizing timeout settings for a speech or DTMF dialog call processing system may include calculating a timeout setting for which X % percent of all callers would have responded for a given dialog state. For example, an optimal timeout setting may yield 95% or 98% of all responses having been received. Such a timeout value selection would be optimal for the call processing system to implement for providing an overwhelming majority of all callers an opportunity to respond without unnecessarily waiting for those callers that will not likely respond at all (i.e., a timeout error).

According to example embodiments of the present invention, individual timeout settings are calculated for each dialog state in a spoken dialog system based on observed caller response timings.

Let $$F_{X_{D_i}}(x) = P_{D_i}(X \le x)$$

describe the cumulative response distribution for dialog state $D_i$ with "x" denoting percentage timeout setting. Thus, in order to obtain optimized timeout settings for each dialog state, $$F_{X_{D_i}}(x)$$

must be estimated with example dialog states yielding $$F_{X_{D_i}}(x) = 0.95 \text{ or } F_{X_{D_i}}(x) = 0.98.$$

Response time patterns can be obtained from system log files or by tracking them at a system runtime in a data table.

It can be assumed that response timings are independent and identically distributed random variables. As a result, given a set of N data samples, $$F_{X_{D_i}}(x)$$

can be modeled with a number of statistical distribution functions. One example of which is the Gaussian distribution function G(x) below:

$$G(x) = \alpha e^{-\frac{1}{2}(\frac{x-\mu}{\sigma})^2}.$$

The parameters $\alpha_{D_i}, \mu_{D_i}, \sigma_{D_i}$ can now be estimated with the Levenberg-Marquardt method (or any other least square curve fitting algorithm) from the available response timings for a given dialog state $D_i$.

Alternative distribution functions that produce a similar shape and which could be used are: a reciprocal model, reciprocal quadratic model, quadratic slow binding model, rational model, cubic model as well as others.

In this example, using the Gaussian model G(x), $$F_{X_{D_i}}(x)$$

becomes:

$$F_{X_{D_i}}(x) = \int_{-\infty}^{x} G(x).$$

Figure 2A:
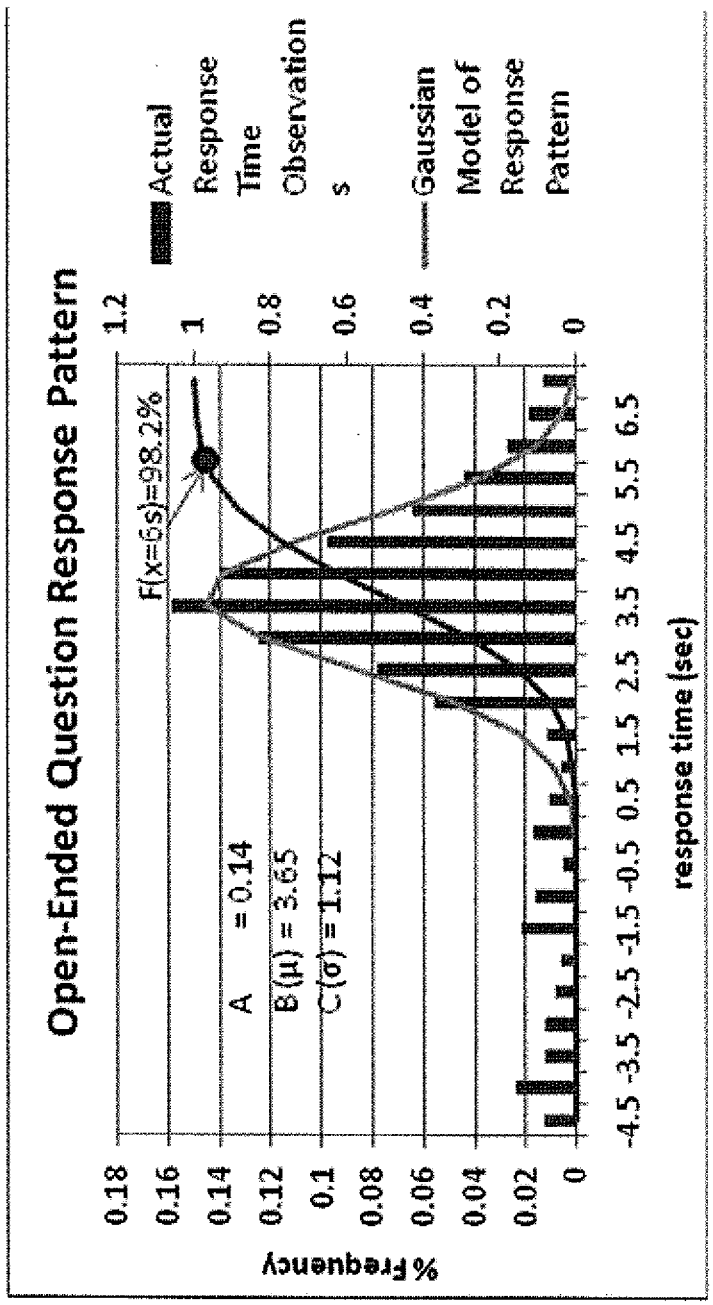
FIG. 2A illustrates a graph of a response pattern for a set of response times according to example embodiments of the present invention.

FIG. 2A illustrates a fitted distribution function G(x) as well as the cumulative normal distribution for the fitted probability function. Referring to FIG. 2A, graph 200 illustrates the estimated distribution function modeling the actually observed data. In statistical terms, the "goodness of fit" can be expressed by the $X^2$ value, which for the example of an open-ended question is $X^2=0.002$. In this example, graph 200 provides a nominal response time of 3.65 seconds as providing the closest response percentage (98.2%) to 100%. This graph is based on open-ended questions being presented to users and receiving user feedback and responses to those questions.

FIG. 2B illustrates an example table 250 including dialog state names, their corresponding type of dialog state, the associated mean and variance as well as F(x)=0.95 and F(x)=0.98 for each dialog state. As can be seen, the optimal timeouts, for either 95% or 98% of all callers having responded, vary significantly by the different dialog state. For example, for an open-ended question, the mean response time is 3.6 s and only after 7 s one can expect 98% of all callers to have responded. In contrast, for a directed menu dialog state referred to as 'AgentSomethingElse' this menu plays if a caller requests an agent upfront. In this example, one can expect 98% of callers to have responded by 3 s.

Given the above examples for estimating F(0.98) for each dialog state, the task to optimize the dialog specific timeout settings in a spoken dialog becomes relatively straightforward. An example method of operation may include collecting caller response timings for each dialog state in the dialog system that are to be optimized. For each of these dialog states $D_i$, the parameters $\alpha_{D_i}, \mu_{D_i}, \sigma_{D_i}$ of a Gaussian distribution are estimated. The estimation may be performed via the Levenberg-Marquardt method or any other least square fitting algorithm. Then, a response completeness value or response confidence value is selected, such as 0.95 or 0.98 (i.e., the optimized timeout value should be based on either 95% or 98% of all responses). Next, a plot $F(x_{D_i})$ is performed for each dialog state and the time $x_{D_i}$ is determined for each dialog state $D_i$, so that $F(x_{D_i})=0.95$. The resulting time will be selected as the optimized timeout setting. The timeout settings for each dialog state $D_i$ should be set to the optimal setting $x_{D_i}$.

Figure 3:
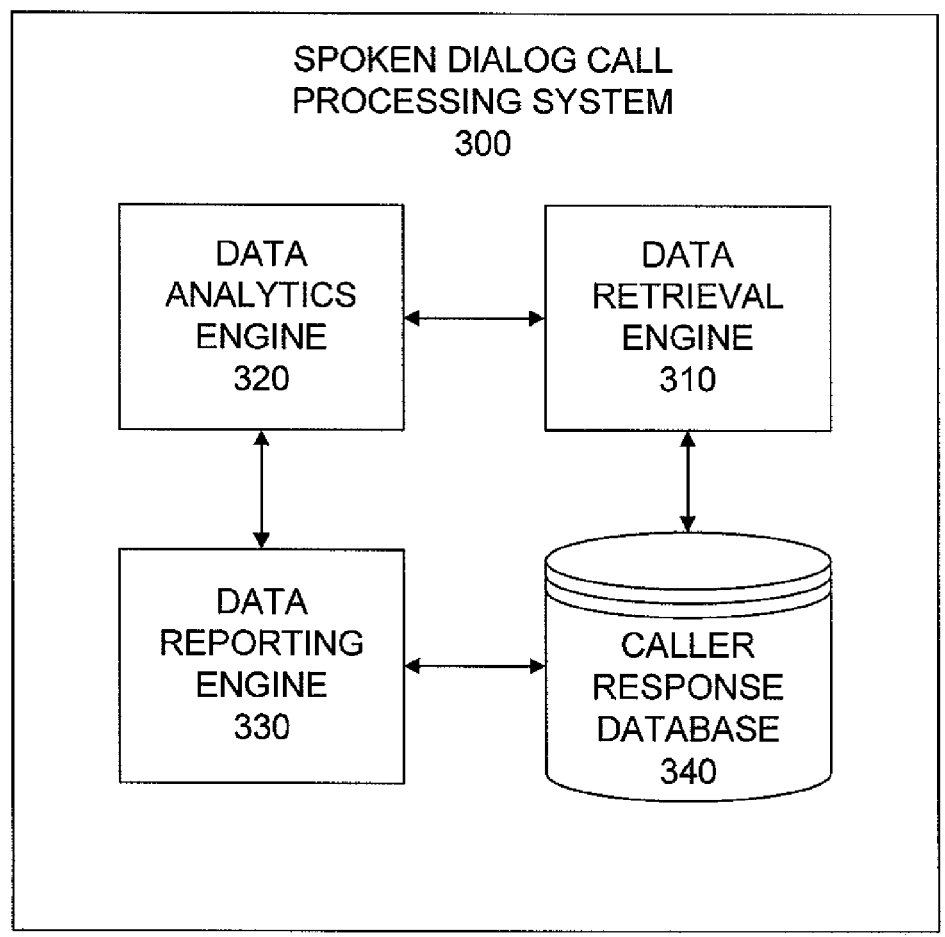
FIG. 3 illustrates an example spoken dialog call processing system infrastructure according to example embodiments of the present invention.

FIG. 3 illustrates an example call processing system 300 according to example embodiments of the present invention. Referring to FIG. 3, the call processing system 300 may be embodied in a single computing device (i.e., server, network computing device, etc.), or multiple computing devices. Within the call processing system 300 are multiple processing modules which may be part of the individual hardware components, such as processor, memory, etc. The memory may store instructions which when executed causes the system 300 to perform a variety of operations described in detail below.

The system 300 may include a caller response database 340 which stores the results of the caller responses to dialog states (i.e., automated questions, prompts, requests, etc.). The caller responses may be collected in real-time during the course of an active call or a test call. The collected caller responses may be associated with timestamps to provide response timings for each dialog state conducted during the course of the call and based on the times the dialog states were presented and the times the user responses were received. The data retrieval engine 310 may access the caller response timings which correlate to the dialog states. For each dialog state, an estimate may be calculated for the mean, average, variance and other parameters for a distribution function model.

The Levenberg-Marquardt algorithm (LMA) provides a numerical function minimization algorithm. Over a space of parameters of the function, the LMA interpolates between the Gaussian-Newton algorithm (GNA) or Gaussian distribution to include a gradient descent. The LMA may be more robust than a simple Gaussian-Newton algorithmsince it provides a solution even if it starts very far off the final minimum values. The LMA provides a curve-fitting algorithm used in many software applications for solving generic curve-fitting problems.

The data retrieval engine or module 310 provides the data analytics engine 320 with the data necessary to calculate the LMA parameter estimation and select a response completeness value or confidence value, such as 95% or 98%. For each dialog state, a plot should be generated by the data reporting engine 330 and a time should be looked up for each dialog state. A time may be selected as the optimized timeout setting based on the probability distribution function as defined by the estimated parameters. These operations may be performed autonomously via the results of the above-noted functions. Or, a data analyst may view the graphs and decide what values should be used in future calls. Alternatively, instead of looking-up results on a graph, the optimal timeout setting can also be found by starting with a relatively high timeout value, for example 8 seconds, and then calculating the value of $F(x_{D_j})$ for a gradually decreasing $x_{D_j}$ until $F(x_{D_j})=0.98$. The final timeout settings must be selected for each dialog state to provide an optimal time setting with optimal user response feedback.

In one example implementation, a relatively high timeout value may be selected to calculate the initial F(x) value and then gradually decrease x until F(x) equals the target metric of the completeness interval or success rate of the caller feedback and responses. The term 'completeness interval' may be used to represent the time interval by which X % of all callers would have completed answering questions and providing answers or feedback.

According to an example embodiment, an apparatus may include a receiver configured to receive caller response timings to each of a plurality of dialog states (i.e., questions) conducted during a call, and a processor configured to estimate a plurality of parameters by selecting a probability distribution that closely matches the observed caller response timings and calculating at least one optimal timeout value based on the estimated plurality of parameters, and setting at least one optimal timeout value for each of the corresponding dialog states.

The operations of a method or algorithm described in connection with the embodiments disclosed herein may be embodied directly in hardware, in a computer program executed by a processor, or in a combination of the two. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example FIG. 4 illustrates an example network element 400, which may represent any of the above-described network components of the other figures.

Figure 4:
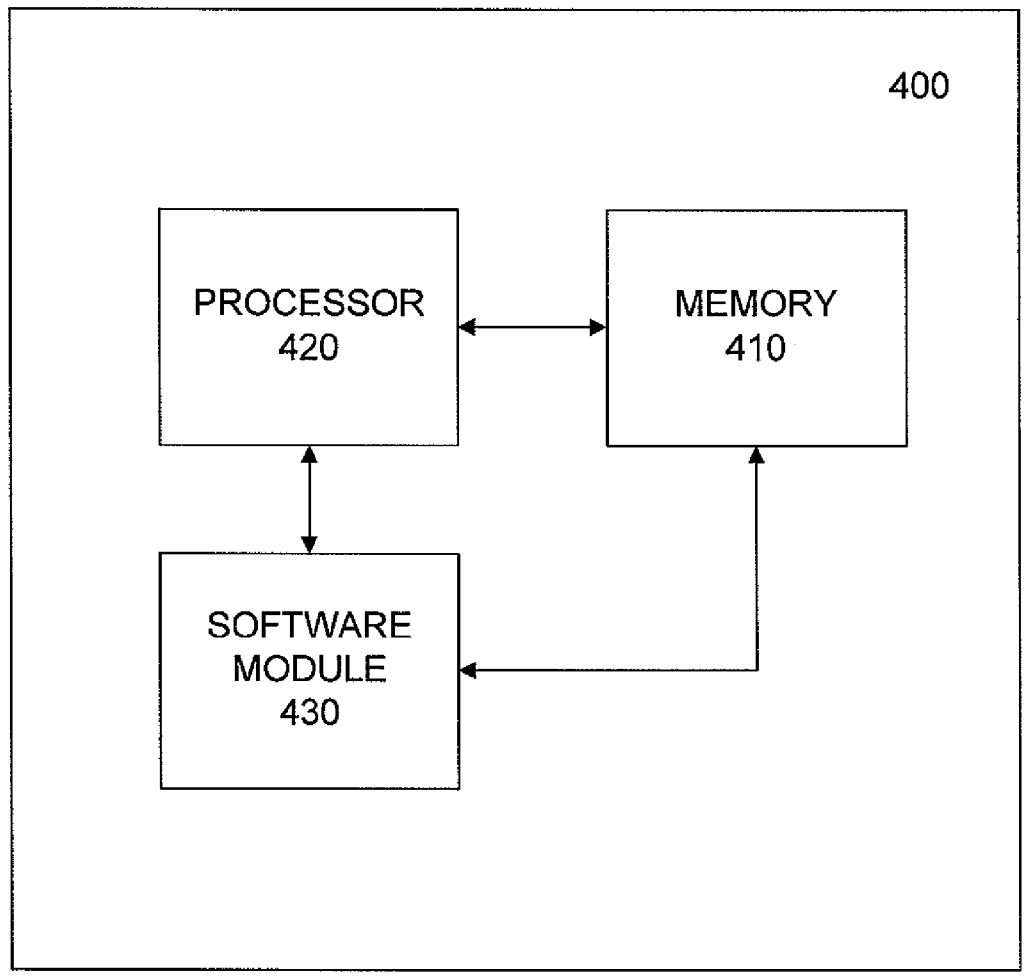
FIG. 4 illustrates a network entity that may include memory, software code and other computer processing hardware, and which may be configured to perform operations according to example embodiments of the present invention.

As illustrated in FIG. 4, a memory 410 and a processor 420 may be discrete components of the network entity 400 that are used to execute an application or set of operations. The application may be coded in software in a computer language understood by the processor 420, and stored in a computer readable medium, such as, the memory 410. Furthermore, a software module 430 may be another discrete entity that is part of the network entity 400, and which contains software instructions that may be executed by the processor 420. In addition to the above noted components of the network entity 400, the network entity 400 may also have a transmitter and receiver pair configured to receive and transmit communication signals (not shown).

Figure 5:
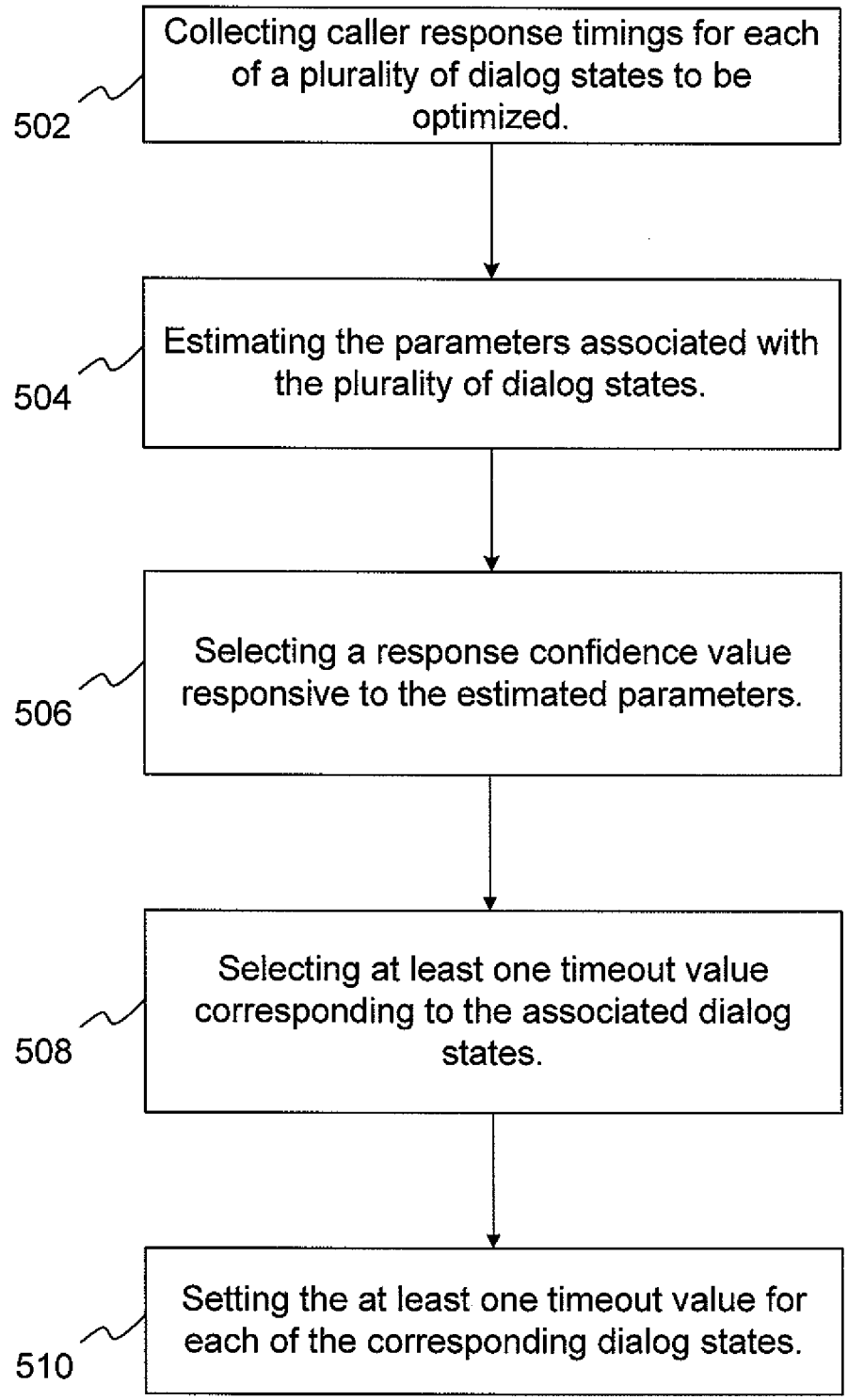
FIG. 5 illustrates a flow diagram of an example method of operation according to example embodiments of the present invention.

One example embodiment of the present invention may include a method as illustrated in the flow diagram of FIG. 5. The method may include collecting caller response timings to each of a plurality of dialog states conducted during a call, at operation 502, and estimating a plurality of parameters based on the caller response timings, at operation 504. The method may also include selecting a response completeness value responsive to the estimated plurality of parameters, the response completeness value being a success rate used to calculate at least one optimal timeout value, at operation 506 and selecting that at least one optimal timeout value, at operation 508. The method may also include setting the at least one optimal timeout value for each of the corresponding dialog states, at operation 510. The calculated timeout values may be used during the call or for subsequent calls as an optimal timeout value.

While preferred embodiments of the present invention have been described, it is to be understood that the embodiments described are illustrative only and the scope of the invention is to be defined solely by the appended claims when considered with a full range of equivalents and modifications (e.g., protocols, hardware devices, software platforms etc.) thereto.

What is claimed is:

1. A method, comprising:
   collecting caller responses to each of a plurality of dialog states conducted during a call;

associating timestamps with each of the caller responses received;

identifying caller response timings corresponding to the caller responses and storing the caller response timings and the timestamps in memory at a call processing server, wherein the caller response timings are a function of times when the plurality of dialog states are presented to the caller during the call and times when the caller responses to the plurality of dialog states were received and associated with the timestamps;

estimating a plurality of parameters based on the caller response timings;

selecting a response completeness value as a percentage of the total callers that have provided caller responses responsive to the estimated plurality of parameters being calculated;

calculating at least one optimal timeout value associated with the call based on the selected response completeness value;

selecting the at least one optimal timeout value; and setting the at least one optimal timeout value at the call processing server for each of the corresponding plurality of dialog states to timeout during at least one of the call and a subsequent call.

2. The method of claim 1, wherein estimating the plurality of parameters comprises calculating a probability distribution based on the caller response timings.

3. The method of claim 2, wherein calculating the probability distribution comprises calculating a Gaussian distribution using a Levenberg-Marquardt algorithm based on the caller response timings.

4. The method of claim 1, wherein the caller response timings comprise instances in time when the callers responded to at least one of questions and prompts generated during the call.

5. The method of claim 1, wherein setting the at least one optimal timeout value for each of the corresponding plurality of dialog states comprises setting a plurality of different timeout values for the corresponding plurality of dialog states.

6. The method of claim 1, wherein the response completeness value is equal to or greater than 95% of all caller response timings.

7. An apparatus, comprising:
a receiver configured to receive caller responses to each of a plurality of dialog states conducted during a call;
a memory configured to store caller response timings corresponding to the caller responses; and
a processor configured to
associate timestamps with each of the caller responses received;
identify caller response timings corresponding to the caller responses and store the caller response timings and the timestamps in the memory, wherein the caller response timings are a function of times when the plurality of dialog states are presented to the caller during the call and times when the caller responses to the plurality of dialog states were received and associated with the timestamps,
estimate a plurality of parameters based on the caller response timings,
select a response completeness value as a percentage of the total callers that have provided caller responses responsive to the estimated plurality of parameters being calculated,
calculate at least one optimal timeout value associated with the call based on the selected response completeness value,
select the at least one optimal timeout value, and
set the at least one optimal timeout value for each of the corresponding plurality of dialog states to timeout during at least one of the call and a subsequent call.

8. The apparatus of claim 7, wherein to estimate the plurality of parameters a probability distribution is calculated based on the caller response timings.

9. The apparatus of claim 8, wherein the probability distribution is a Gaussian distribution that is calculated by using a Levenberg-Marquardt algorithm based on the caller response timings.

10. The apparatus of claim 7, wherein the caller response timings comprise instances in time when the callers responded to at least one of questions and prompts generated during the call.

11. The apparatus of claim 7, wherein the at least one optimal timeout value set for each of the corresponding plurality of dialog states comprises a plurality of different timeout values being set for the corresponding plurality of dialog states.

12. The apparatus of claim 7, wherein the response completeness value is equal to or greater than 95% of all caller response timings.

13. A non-transitory computer readable storage medium configured to store instructions that when executed cause a processor to perform:
collecting caller responses to each of a plurality of dialog states conducted during a call;
associating timestamps with each of the caller responses received;
identifying caller response timings corresponding to the caller responses and storing the caller response timings and the timestamps in memory at a call processing server, wherein the caller response timings are a function of times when the plurality of dialog states are presented to the caller during the call and times when the caller responses to the plurality of dialog states were received and associated with the timestamps;
estimating a plurality of parameters based on the caller response timings;
selecting a response completeness value as a percentage of the total callers that have provided caller responses responsive to the estimated plurality of parameters being calculated;
calculating at least one optimal timeout value associated with the call based on the selected response completeness value;
selecting the at least one optimal timeout value; and
setting the at least one optimal timeout value at the call processing server for each of the corresponding plurality of dialog states to timeout during at least one of the call and a subsequent call.

14. The non-transitory computer readable storage medium of claim 13, wherein estimating the plurality of parameters comprises calculating a probability distribution based on the caller response timings.

15. The non-transitory computer readable storage medium of claim 14, wherein calculating the probability distribution comprises calculating a Gaussian distribution using a Levenberg-Marquardt algorithm based on the caller response timings.

16. The non-transitory computer readable storage medium of claim 13, wherein the caller response timings comprise instances in time when the callers responded to at least one of questions and prompts generated during the call.

17. The non-transitory computer readable storage medium of claim 13, wherein the setting the at least one optimal timeout value for each of the corresponding plurality of dialog states comprises setting a plurality of different timeout values for the corresponding plurality of dialog states.

\* \* \* \* \*